(12) United States Patent
Kossev (10) Patent No.: US 12,263,805 B2
(45) Date of Patent: Apr. 1, 2025

(54) VEHICLE SEATBELT HEIGHT ADJUSTER PREVENTING AGAINST INERTIAL UNLOCKING

(71) Applicant: Atieva, Inc., Newark, CA (US)

(72) Inventor: Andrey Ivov Kossev, Newark, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/328,505

(22) Filed: Jun. 2, 2023

(65) Prior Publication Data

US 2024/0246507 A1 Jul. 25, 2024

Related U.S. Application Data

(60) Provisional application No. 63/481,554, filed on Jan. 25, 2023.

(51) Int. Cl.
*B60R 22/20* (2006.01)
*B60R 22/24* (2006.01)

(52) U.S. Cl.
CPC ............ *B60R 22/203* (2013.01); *B60R 22/24* (2013.01)

(58) Field of Classification Search
CPC ... B60R 22/201; B60R 22/202; B60R 22/203; B60R 22/205; B60R 22/20; B60R 22/24; B60R 22/18
USPC ............................... 280/801.2, 808; 297/483
See application file for complete search history.

(56) References Cited

U.S. PATENT DOCUMENTS

| 5,655,793 A | 8/1997 | Isonaga | |
|---|---|---|---|
| 6,312,014 B1 * | 11/2001 | Ando | B60R 22/202 297/483 |
| 6,802,537 B1 * | 10/2004 | Tolfsen | B60N 2/508 280/805 |

FOREIGN PATENT DOCUMENTS

| CN | 205381233 U | * 7/2016 | |
|---|---|---|---|
| CN | 106608244 B | 11/2019 | |
| DE | 29701481 U1 | * 4/1997 | ........... B60R 22/203 |
| EP | 1386796 A1 | * 2/2004 | |
| EP | 3653451 A1 | 5/2020 | |

(Continued)

OTHER PUBLICATIONS

Definition of lever; The Free Dictionary; https://www.thefreedictionary.com/lever; May 20, 2024 (Year: 2024).*

(Continued)

*Primary Examiner* — Keith J Frisby
(74) *Attorney, Agent, or Firm* — Brake Hughes Bellermann LLP (57) ABSTRACT

A height adjuster for a vehicle seatbelt comprises: a rail having windows, each of the windows corresponding to a different height adjustment of the height adjuster for the vehicle seatbelt; a slider; a first pin slidingly mounted to the slider, the first pin being moveable in a second direction between (i) an extended position in which the first pin engages with one of the windows and the slider is restricted, and (ii) a retracted position where the first pin does not engage with any of the windows and the slider is not restricted; an actuator for moving the first pin to the retracted position; and a member coupled to the actuator and abutting the first pin in the extended position to restrict the first pin from moving in the second direction, the actuator configured to move the member upon actuation to allow the first pin to assume the retracted position.

8 Claims, 4 Drawing Sheets

(56) References Cited

FOREIGN PATENT DOCUMENTS

| | | | |
|---|---|---|---|
| JP | S6440751 U | * | 3/1989 |
| JP | 2011079404 A | | 4/2011 |
| KR | 19990008654 U | * | 3/1993 |
| KR | 970069656 A | * | 11/1997 |

OTHER PUBLICATIONS

International Search Report and Written Opinion for PCT Application No. PCT/US2024/012794, mailed on Apr. 29, 2024, 14 pages.

* cited by examiner

VEHICLE SEATBELT HEIGHT ADJUSTER PREVENTING AGAINST INERTIAL UNLOCKING

CROSS-REFERENCE TO RELATED APPLICATION

This application claims benefit, under 35 U.S.C. § 119, of U.S. Provisional Patent Application No. 63/481,554, filed on Jan. 25, 2023, entitled "VEHICLE SEATBELT HEIGHT ADJUSTER PREVENTING AGAINST INERTIAL UNLOCKING," the disclosure of which is incorporated by reference herein in its entirety.

TECHNICAL FIELD

This document relates to a vehicle seatbelt height adjuster that prevents against inertial unlocking.

BACKGROUND

Many vehicles are equipped with seatbelts, and use of seatbelts may be legally required in certain areas or countries. A three-point seatbelt typically has a shoulder belt extending from a point behind one of the occupant's shoulders, across their torso, and down to a buckle near the occupant's hip, where a lap belt traversing the pelvis also attaches. Some seatbelts may have a height adjuster on a vehicle pillar to adjust a cross-torso webbing depending on the height of the occupant. A locking mechanism of such an adjuster may be subject to inertial unlocking, for example during a side impact.

SUMMARY

In a first aspect, a height adjuster for a vehicle seatbelt comprises: a rail having windows, each of the windows corresponding to a different height adjustment of the height adjuster for the vehicle seatbelt; a slider configured to be slidingly adjusted relative to the rail, along a first direction, to any of multiple positions, each of the multiple positions associated with a corresponding one of the windows; a first pin slidingly mounted to the slider, the first pin being moveable in a second direction between (i) an extended position in which the first pin engages with one of the windows and the slider is restricted, and (ii) a retracted position where the first pin does not engage with any of the windows and the slider is not restricted, wherein the second direction is substantially perpendicular to the first direction; an actuator coupled to the first pin and configured for moving the first pin to the retracted position; and a member coupled to the actuator and abutting the first pin in the extended position to restrict the first pin from moving in the second direction, the actuator configured to move the member upon actuation to allow the first pin to assume the retracted position.

Implementations can include any or all of the following features. The rail is configured for being mounted to a pillar of a vehicle to allow the height adjustment of the vehicle seatbelt. The first pin further comprises a second pin that is oriented substantially perpendicularly to the first and second directions, the actuator configured to act on the second pin to move the first pin to the retracted position. The actuator includes a sloping edge on a planar member, the sloping edge being angled relative to the first and second directions, wherein the second pin abuts, and is acted on by, the sloping edge during actuation of the actuator. The actuator is in a first actuator position with regard to the slider when the actuator is not actuated, wherein the actuator is in a second actuator position with regard to the slider when the actuator is actuated, wherein the sloping edge is oriented so that a first end of the sloping edge is closer to the rail than a second end of the sloping edge, and wherein the actuation causes the second pin to move from the first end to the second end. The member is a tab on the planar member that is positioned at the first end of the sloping edge, wherein when the second pin is at the first end the second pin is positioned so that the tab is on an opposite side of the second pin from the rail, the tab restricting the first and second pins from moving in the second direction. The tab forms a U-shape at the first end of the sloping edge, wherein when the actuator is not in the first actuator position the second pin is not inside the U-shape, and wherein the sloping edge is oriented to advance the second pin in the second direction. The sloping edge is a first sloping edge, the actuator further including a second sloping edge on the planar member, and wherein the second pin abuts, and is acted on by, both of the first and second sloping edges during the actuation of the actuator. The height adjuster further comprises a bias member positioned against the first pin, the bias member biasing the first pin against moving into the retracted position. The bias member is positioned on an opposite side of the first pin from the rail. The actuator comprises a first lever configured to be rotated about a first pivot, the first pivot being substantially perpendicular to the first and second directions. The actuator further comprises a second lever configured to be rotated about a second pivot, the second pivot being substantially parallel to the first pivot, wherein a first end of the second lever is the member. The second lever further has a second end that is opposite the first end, and wherein a user presses on the second end to actuate the actuator. The actuator further comprises a first bias member on the first lever, the first bias member configured to act on the second lever to abut the member against the first pin in the extended position. The slider further comprises a second bias member positioned against the first pin, the second bias member biasing the first pin against moving into the retracted position. The second bias member is positioned on an opposite side of the first pin from the rail. The first lever comprises a cavity that forms the second pivot, and wherein the second lever is positioned in the cavity.

In a second aspect, a height adjuster for a vehicle seatbelt comprises: a rail having windows, each of the windows corresponding to a different height adjustment of the height adjuster for the vehicle seatbelt; a slider configured to be slidingly adjusted relative to the rail, along a first direction, to any of multiple positions, each of the multiple positions associated with a corresponding one of the windows; a pin slidingly mounted to the slider, the pin being moveable in a second direction between (i) an extended position in which the pin engages with one of the windows and the slider is restricted, and (ii) a retracted position where the pin does not engage with any of the windows and the slider is not restricted, wherein the second direction is substantially perpendicular to the first direction; an actuator coupled to the pin and configured for moving the pin to the retracted position; and means for abutting the pin in the extended position and for being moved upon actuation to allow the pin to assume the retracted position.

BRIEF DESCRIPTION OF DRAWINGS

Like reference symbols in the various drawings indicate like elements.

DETAILED DESCRIPTION

This document describes examples of systems and techniques that prevent inertial unlocking of a vehicle seatbelt height adjuster. This can reduce the occurrence of unwanted disengagement of the positioning device of the height adjuster, while allowing each occupant/user to easily adjust the positioning device to the desired height for use. The device may include a vertically sliding element which blocks the lateral motion of the height adjuster locking device (e.g., a pin) when a button actuated by the occupant is unpressed. Once the button is pressed, the sliding element can be positioned such that lateral motion of the pin is unblocked. When a lateral acceleration is applied to the pin, as in a side impact, without the button depressed, the locking device does not disengage the slider from the rail.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle, or the vehicle can be unpowered (e.g., when a trailer is attached to another vehicle). The vehicle can include a passenger compartment accommodating one or more persons. At least one vehicle occupant can be considered the driver; various tools, implements, or other devices, can then be provided to the driver. A person carried by a vehicle can be referred to as a "driver" or a "passenger" of the vehicle, regardless whether the person is driving the vehicle, or whether the person has access to controls for driving the vehicle, or whether the person lacks controls for driving the vehicle.

Figure 1:
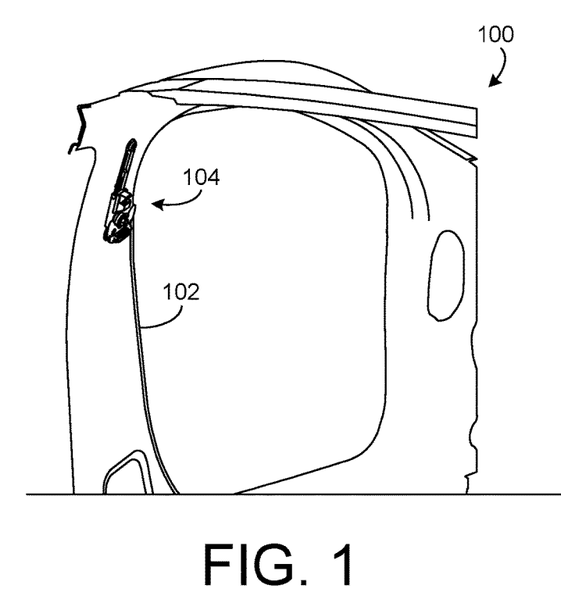
FIG. 1 shows an example of a vehicle body having a pillar with a height adjuster for a vehicle seatbelt.
Figure 2:
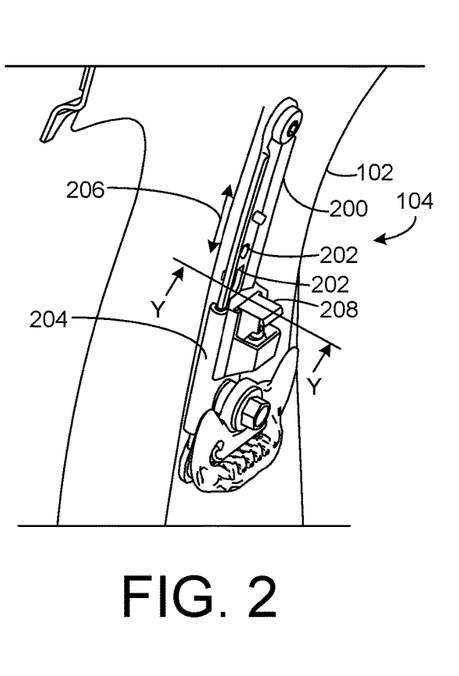
FIG. 2 shows the height adjuster of FIG. 1.
Figure 3:
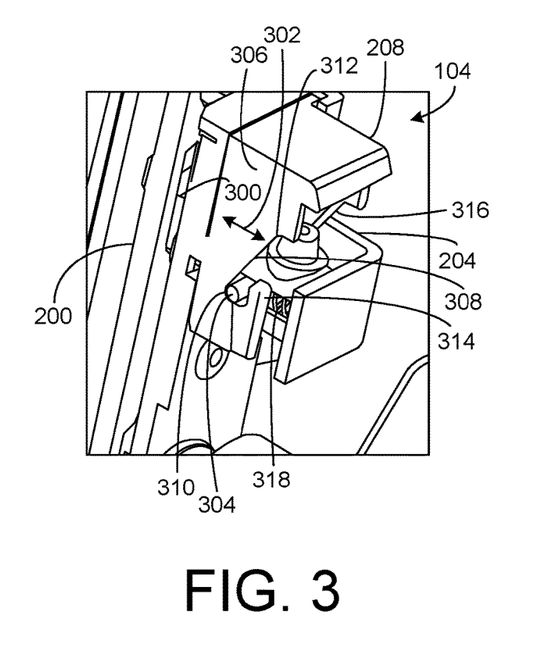
FIG. 3 shows an example cross section of the height adjuster of FIG. 2 along the line y-y.
Figure 4:
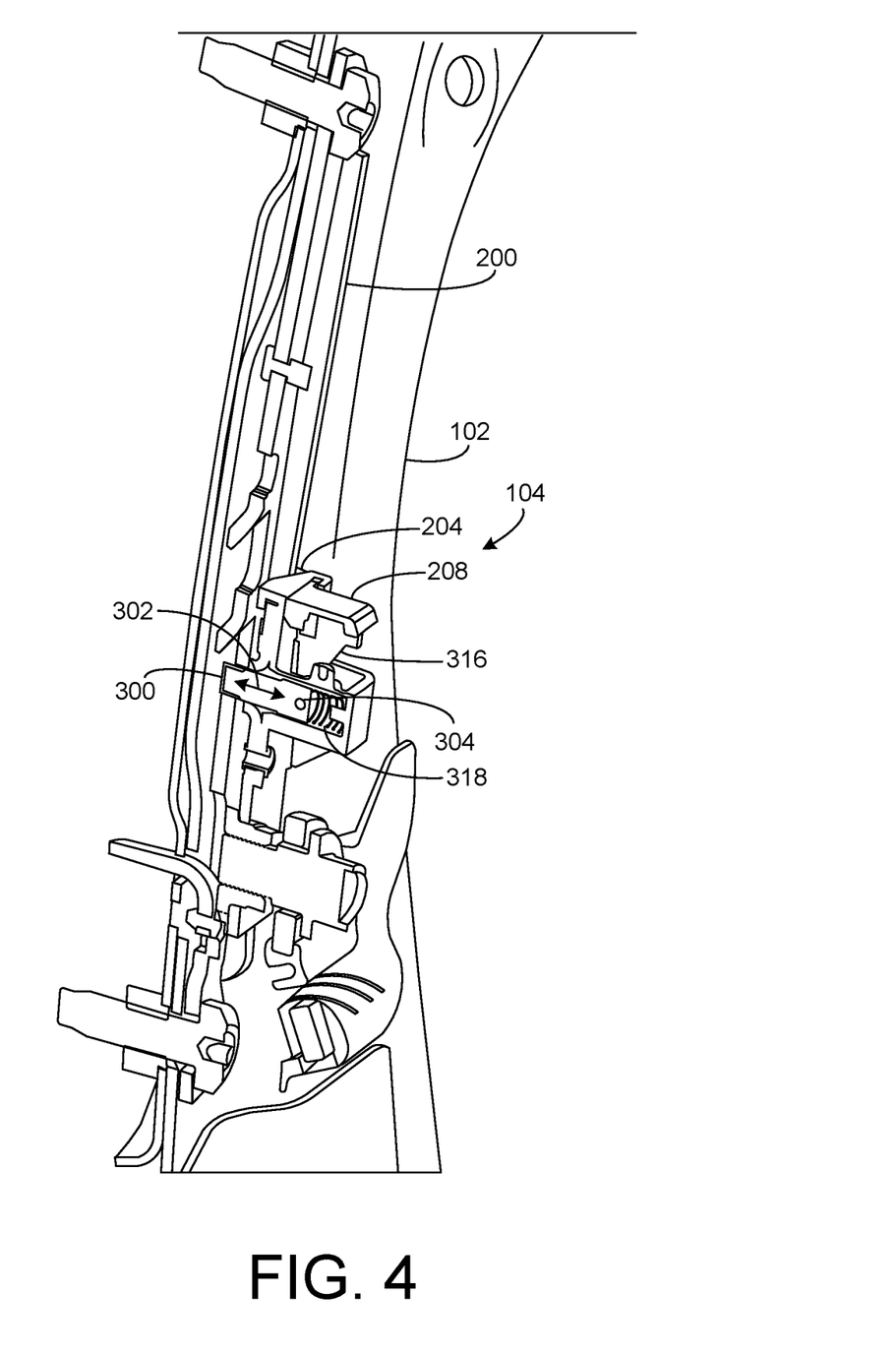
FIG. 4 shows an example cross section of the height adjuster of FIG. 1.

FIG. 1 shows an example of a vehicle body 100 having a pillar 102 with a height adjuster 104 for a vehicle seatbelt. FIG. 2 shows the height adjuster 104 of FIG. 1. FIG. 3 shows an example cross section of the height adjuster 104 of FIG. 2 along the line Y-Y. FIG. 4 shows an example cross section of the height adjuster of FIG. 1. Elements of examples described herein have reference numerals generally associated with the number of the figure where the element is first mentioned (e.g., 100-series numbers are used for the elements first appearing in FIG. 1).

The height adjuster 104 can be used with one or more other examples described elsewhere herein. The vehicle body 100 can be made of any of multiple materials, including, but not limited to, aluminum and/or steel. The height adjuster 104 can be mounted in any of multiple places on the vehicle body 100. In some implementations, the height adjuster 104 is configured for being mounted to the pillar 102. For example, the pillar 102 can be a B-pillar or a C-pillar of the vehicle, or another pillar. The height adjuster 104 can include a rail 200 that is configured for being mounted to the pillar 102. The rail 200 has windows 202. Each of the windows 202 corresponds to a different height adjustment of the height adjuster 104. That is, an anchor point for the vehicle seatbelt (e.g., a D-ring through which the seatbelt extends) is securely placed at any of multiple heights using the windows 202. The height adjuster 104 includes a slider 204 configured to be slidingly adjusted relative to the rail 200 to any of multiple positions. The slider 204 is adjusted along a direction 206 along the rail 200. For example, the direction 206 can be substantially parallel with a z-direction in a vehicle coordinate system. That is, each of the multiple positions of the slider 204 is associated with a corresponding one of the windows 202.

The height adjuster 104 includes a pin 300 that is slidingly mounted to the slider 204. The pin 300 is moveable in a direction 302 between multiple positions. The direction 302 is substantially perpendicular to the direction 206. For example, the direction 302 can be substantially parallel with a y-direction in the vehicle coordinate system. The position of the pin 300 shown in FIGS. 3-4 is an extended position in which the pin 300 engages with one of the windows 202 and in which the slider 204 is restricted. When the pin 300 is moved away from the extended position along the direction 302, the pin 300 instead assumes a retracted position. In the retracted position the pin 300 does not engage with any of the windows 202 and the slider 204 is not restricted.

The height adjuster 104 includes an actuator 208 coupled to the pin 300 and configured for moving the pin 300 to the retracted position. The occupant can use the actuator 208 (e.g., by pressing or lifting) to move the pin 300 to the retracted position so as to facilitate adjustment of the slider 204. The actuator 208 can, when actuated, slide relative to the slider 204.

The pin 300 can include a pin 304 that is oriented substantially perpendicularly to each of the directions 206 and 302. For example, the pin 304 can be substantially parallel with an x-direction in the vehicle coordinate system. The actuator 208 can be configured to act on the pin 304 to move the pin 300 to the retracted position. The actuator 208 can include a planar member 306 having a sloping edge 308. The sloping edge 308 is angled relative to the directions 206 and 302. For example, the sloping edge 308 can extend substantially in a y-z-plane of the vehicle coordinate system. The pin 304 abuts, and is acted on by, the sloping edge 308 during actuation of the actuator 208. As such, the actuator 208 can move the pin 300 toward the retracted position by acting on the pin 304 with the sloping edge 308.

The sloping edge 308 can extend between an end 310 and an end 312 formed in the planar member 306. The distance between the end 310 and the rail 200 is shorter than the distance between the end 312 and the rail 200. In FIG. 3, the pin 304 is shown at the end 310. The actuator 208 is in a first actuator position with regard to the slider 204 in the illustrated example (e.g., when not actuated). The actuator 208 can be in a second actuator position with regard to the slider 204 when the actuator is actuated (e.g., in a depressed or lifted position). The actuation of the actuator 208 can cause the pin 304 to move along the sloping edge 308 from the end 310 to, or toward, the end 312.

The height adjuster 104 can include a member 314 on the planar member 306. The member 314 is coupled to the actuator 208 and can abut the pin 300 in the extended position (e.g., by abutting the pin 304, which can be part of the pin 300) to restrict the pin 300 from moving in the direction 302. As such, the actuator 208 can be configured to move the member 314 upon actuation to allow the pin 300 to assume the retracted position. The member 314 can be, or include, a tab on the planar member 306. The tab can be positioned at the end 310 of the sloping edge 308. When the pin 304 is at the end 310 the pin 304 can be positioned so that the tab is on an opposite side of the pin 304 from the rail 200. In some implementations, the member 314 (e.g., the tab) forms a U-shape at the end 310 of the sloping edge 308. When the actuator 208 is not in the first actuator position (e.g., while being actuated) the pin 304 is not inside the U-shape. The sloping edge 308 can be oriented to advance the pin 304 in the direction 302 during actuation. As such, the member 314 (e.g., the tab) can restrict the pins 300 and 304 from moving in the direction 302. The member 314 can abut the pin 300 (e.g., by abutting the pin 304 thereof) in the extended position, and can be moved upon actuation of the actuator 208 to allow the pin 300 to assume the retracted position.

In some implementations, the height adjuster 104 can have more than one sloping edge used for moving the pin 300. Here, the actuator 208 further includes a sloping edge 316 on the planar member 306. The pin 304 can abut, and be acted on, also by the sloping edge 316. The sloping edge 316 can also or instead have a member corresponding to the member 314 (e.g., a tab) for the pin 304.

The height adjuster 104 can include a bias member 318 for the pin 300. The bias member 318 can be positioned against the pin 300 and bias the pin 300 against moving into the retracted position. The bias member 318 can be a flexible and or compressible element, including but not limited to a compression spring. The bias member 318 can be positioned on an opposite side of the pin 300 from the rail 200.

The above examples illustrate that a height adjuster for a vehicle seatbelt (e.g., the height adjuster 104) can include: a rail (e.g., the rail 200) having windows (e.g., the windows 202), each of the windows corresponding to a different height adjustment of the height adjuster for the vehicle seatbelt; a slider (e.g., the slider 204) configured to be slidingly adjusted relative to the rail, along a first direction (e.g., the direction 206), to any of multiple positions, each of the multiple positions associated with a corresponding one of the windows; a first pin (e.g., the pin 300) slidingly mounted to the slider, the first pin being moveable in a second direction (e.g., the direction 302) between (i) an extended position (e.g., FIGS. 3-4) in which the first pin engages with one of the windows and the slider is restricted, and (ii) a retracted position where the first pin does not engage with any of the windows and the slider is not restricted, wherein the second direction is substantially perpendicular to the first direction; an actuator (e.g., the actuator 208) coupled to the first pin and configured for moving the first pin to the retracted position; and a member (e.g., the member 314) coupled to the actuator and abutting the first pin in the extended position to restrict the first pin from moving in the second direction, the actuator configured to move the member upon actuation to allow the first pin to assume the retracted position.

Figure 5:
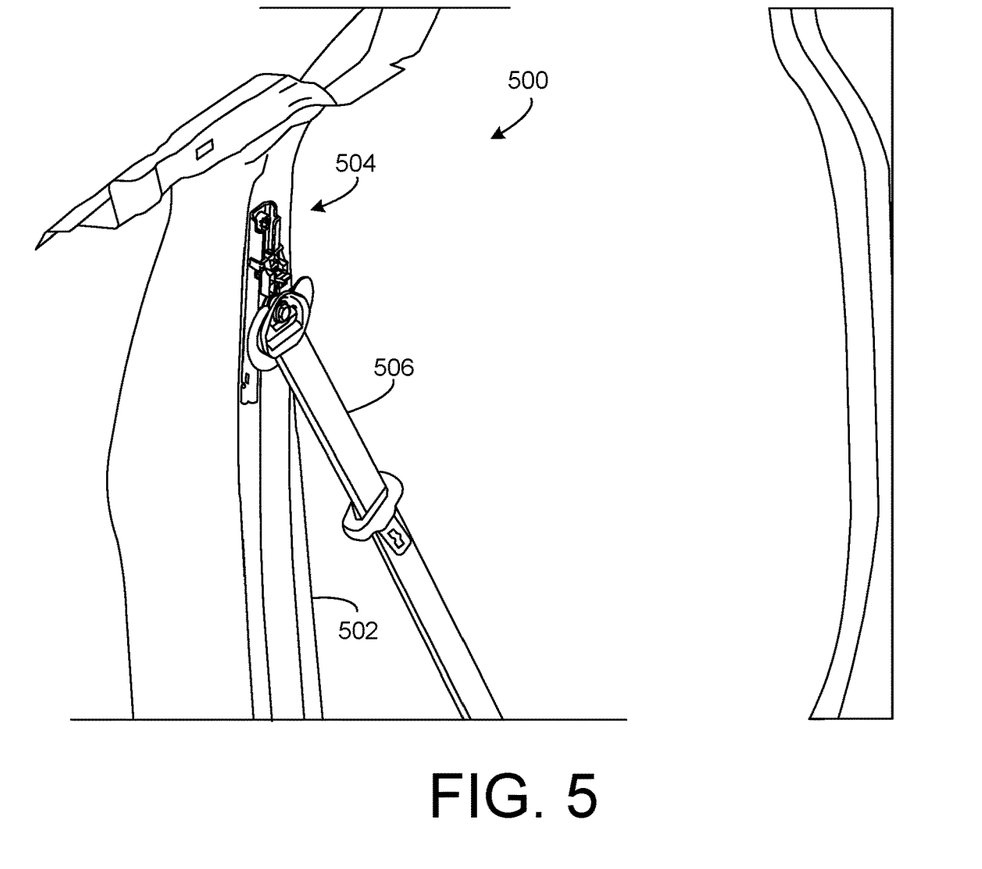
FIG. 5 shows an example of a vehicle body having a pillar with a height adjuster for a vehicle seatbelt.
Figure 6:
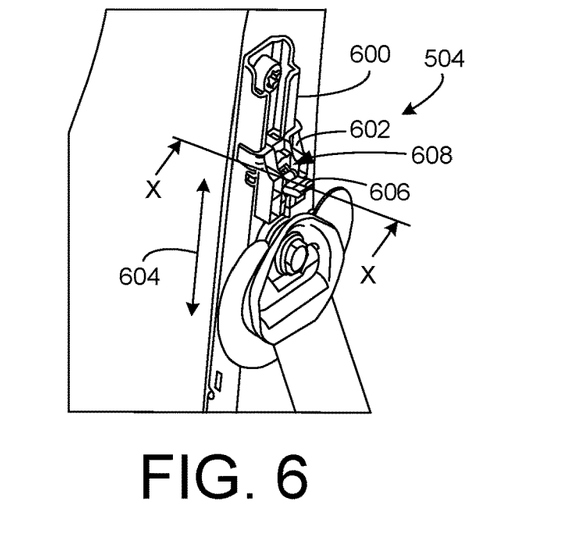
FIG. 6 shows the height adjuster of FIG. 5.
Figure 7:
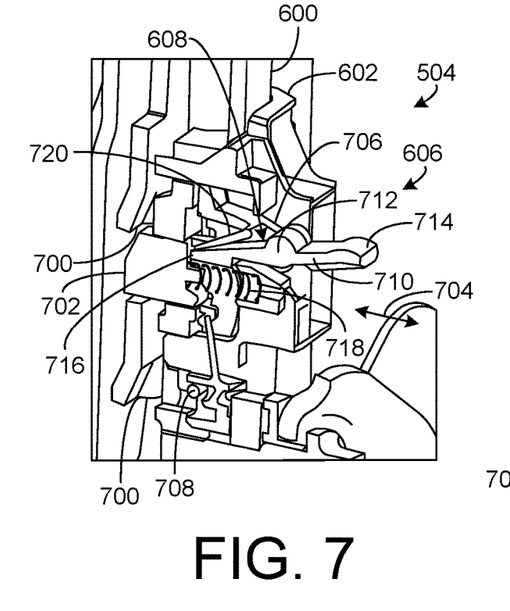
FIGS. 7-9 show example cross sections of the height adjuster of FIG. 6 along the line x-x.
Figure 8:
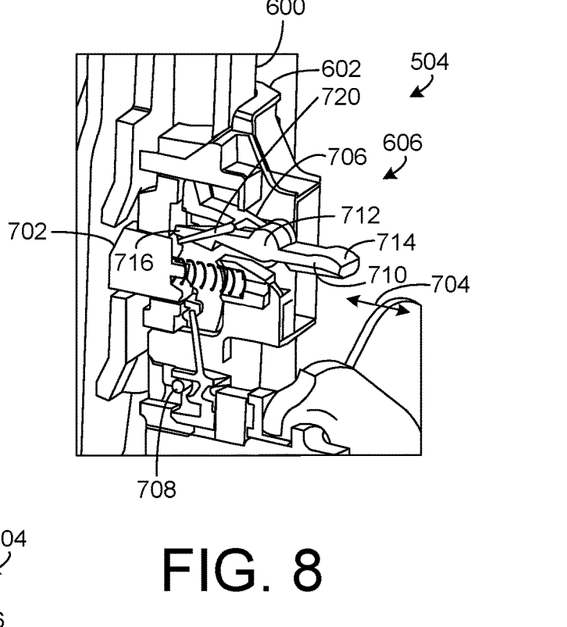
Figure 9:
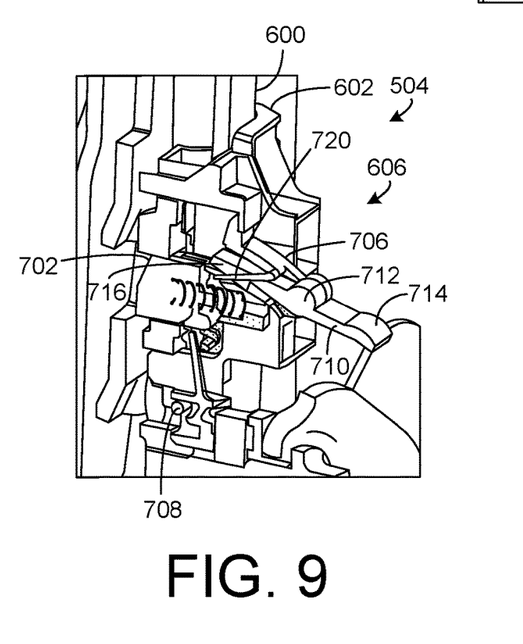

FIG. 5 shows an example of a vehicle body 500 having a pillar 502 with a height adjuster 504 for a vehicle seatbelt 506. FIG. 6 shows the height adjuster 504 of FIG. 5. FIGS. 7-9 show example cross sections of the height adjuster 504 of FIG. 6 along the line X-X. The height adjuster 504 can be used with one or more other examples described elsewhere herein. The vehicle body 500 can be made of any of multiple materials, including, but not limited to, aluminum and/or steel. The height adjuster 504 can be mounted in any of multiple places on the vehicle body 500. In some implementations, the height adjuster 504 is configured for being mounted to the pillar 502. For example, the pillar 502 can be a B-pillar or a C-pillar of the vehicle, or another pillar. The height adjuster 504 can include a rail 600 that is configured for being mounted to the pillar 502. The rail 600 has windows 700. Each of the windows 700 corresponds to a different height adjustment of the height adjuster 504. That is, an anchor point for the vehicle seatbelt (e.g., a D-ring through which the vehicle seatbelt 506 extends) is securely placed at any of multiple heights using the windows 700. The height adjuster 504 includes a slider 602 configured to be slidingly adjusted relative to the rail 600 to any of multiple positions. The slider 602 is adjusted along a direction 604 along the rail 600. For example, the direction 604 can be substantially parallel with a z-direction in a vehicle coordinate system. That is, each of the multiple positions of the slider 602 is associated with a corresponding one of the windows 700.

The height adjuster 504 includes a pin 702 that is slidingly mounted to the slider 602. The pin 702 is moveable in a direction 704 between multiple positions. The direction 704 is substantially perpendicular to the direction 604. For example, the direction 704 can be substantially parallel with a y-direction in the vehicle coordinate system. The position of the pin 702 shown in FIGS. 7-8 is an extended position in which the pin 702 engages with one of the windows 700 and in which the slider 602 is restricted. When the pin 702 is moved away from the extended position along the direction 704, the pin 702 instead assumes a retracted position (e.g., as shown in FIG. 9). In the retracted position the pin 702 does not engage with any of the windows 700 and the slider 602 is not restricted.

The height adjuster 504 includes an actuator 606 coupled to the pin 702 and configured for moving the pin 702 to the retracted position. The occupant can use the actuator 606 (e.g., by pressing or lifting) to move the pin 702 to the retracted position so as to facilitate adjustment of the slider 602. The actuator 606 can, when actuated, pivot relative to the slider 602.

The actuator 606 can include a lever 706 configured to be rotated about a pivot 708. The pivot 708 can be substantially perpendicular to the directions 604 and 704. For example, the pivot 708 can be substantially parallel with an x-direction in the vehicle coordinate system. The lever 706 is attached to, or includes a feature engaging with, the pin 702. For example, one or more hooks on the lever 706 can engage with a protruding edge on the pin 702 such that the lever 706 can pull the pin 702 in the direction 704.

The actuator 606 can include a lever 710 configured to be rotated about a pivot 712. The pivot 712 can be positioned on the lever 706 and can be substantially parallel to the pivot 708. An end 714 of the lever 710 can serve as a handle for an occupant, such that the occupant presses or pulls on the end 714 to actuate the actuator 606. The lever 710 has an end 716 that is opposite the end 714 and that comprises a member abutting the pin 702 in the extended position to restrict the pin 702 from moving in the direction 704. The actuator 606 can be configured to move the member upon actuation to allow the pin 702 to assume the retracted position. In some implementations, the actuator 606 has a cavity 608 that forms the pivot 712 (e.g., the lever 706 can include two lever members parallel to and spaced from each other so as to form the cavity 608). The lever 710 can be positioned in the cavity 608. The member of the end 716 can abut the pin 702 in the extended position, and can be moved upon actuation of the actuator 606 to allow the pin 702 to assume the retracted position.

The height adjuster 504 can include a bias member 718 for the pin 702. The bias member 718 can be positioned against the pin 702 and bias the pin 702 against moving into the retracted position. The bias member 718 can be a flexible and or compressible element, including but not limited to a compression spring. The bias member 718 can be positioned on an opposite side of the pin 702 from the rail 600.

The actuator can include a bias member 720 on the lever 706. The bias member 720 can be configured to act on the lever 710 so that the member of the end 716 abuts against the pin 702 in the extended position. For example, the bias member 720 can be a plastic return spring feature. As another example, the bias member 720 can be a discrete torsion spring.

The above examples illustrate that a height adjuster for a vehicle seatbelt (e.g., the height adjuster 504 for the seatbelt 506) can include: a rail (e.g., the rail 600) having windows (e.g., the windows 700), each of the windows corresponding to a different height adjustment of the height adjuster for the vehicle seatbelt; a slider (e.g., the slider 602) configured to be slidingly adjusted relative to the rail, along a first direction (e.g., the direction 604), to any of multiple positions, each of the multiple positions associated with a corresponding one of the windows; a first pin (e.g., the pin 702) slidingly mounted to the slider, the first pin being moveable in a second direction (e.g., the direction 704) between (i) an extended position (e.g., FIGS. 7-8) in which the first pin engages with one of the windows and the slider is restricted, and (ii) a retracted position (e.g., FIG. 9) where the first pin does not engage with any of the windows and the slider is not restricted, wherein the second direction is substantially perpendicular to the first direction; an actuator (e.g., the actuator 606) coupled to the first pin and configured for moving the first pin to the retracted position; and a member (e.g., the member of the end 716) coupled to the actuator and abutting the first pin in the extended position to restrict the first pin from moving in the second direction, the actuator configured to move the member upon actuation to allow the first pin to assume the retracted position.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A height adjuster for a vehicle seatbelt, the height adjuster comprising:
    a rail having windows, each of the windows corresponding to a different height adjustment of the height adjuster for the vehicle seatbelt;
    a slider configured to be slidingly adjusted relative to the rail, along a first direction, to any of multiple positions, each of the multiple positions associated with a corresponding one of the windows;
    a first pin slidingly mounted to the slider, the first pin being moveable in a second direction between (i) an extended position in which the first pin engages with one of the windows and the slider is restricted, and (ii) a retracted position where the first pin does not engage with any of the windows and the slider is not restricted, wherein the second direction is substantially perpendicular to the first direction; and
    an actuator coupled to the first pin and configured for moving the first pin to the retracted position, the actuator including a first rotatable member abutting the first pin in the extended position to restrict the first pin from moving in the second direction out of the one of the windows, the actuator configured to move the first rotatable member upon actuation to allow the first pin to assume the retracted position, wherein the first rotatable member is configured to be rotated about a first pivot, the first pivot being substantially perpendicular to the first and second directions, wherein the actuator further comprises a lever configured to be rotated about a second pivot, the second pivot being substantially parallel to the first pivot, wherein a first end of the lever is the first rotatable member.

2. The height adjuster of claim 1, wherein the lever further has a second end that is opposite the first end, and wherein the actuator is configured so that pressing on the second end actuates the actuator.

3. The height adjuster of claim 1, wherein the actuator further comprises a first bias member on the first rotatable member, the first bias member configured to act on the lever to abut the member against the first pin in the extended position.

4. The height adjuster of claim 3, wherein the slider further comprises a second bias member positioned against the first pin, the second bias member biasing the first pin against moving into the retracted position.

5. The height adjuster of claim 4, wherein the second bias member is positioned on an opposite side of the first pin from the rail.

6. The height adjuster of claim 4, wherein the second bias member comprises a compression spring.

7. The height adjuster of claim 3, wherein the first bias member comprises a plastic return spring feature or a discrete torsion spring.

8. The height adjuster of claim 1, wherein the first rotatable member comprises a cavity that forms the second pivot, and wherein the lever is positioned in the cavity.

* * * * *